(No Model.)
J. J. REUTLINGER.
FRYING PAN.
No. 566,226. Patented Aug. 18, 1896.
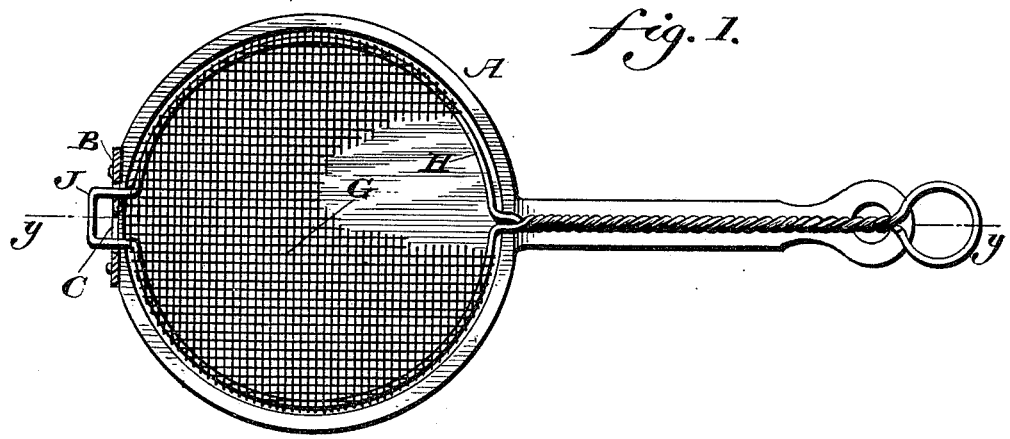
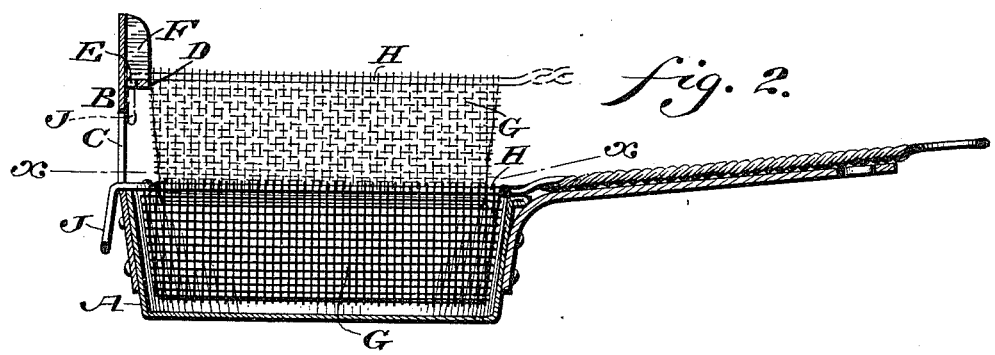
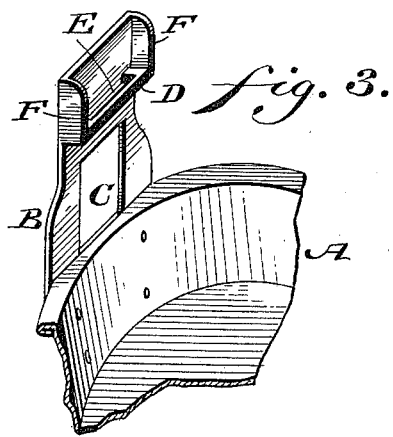
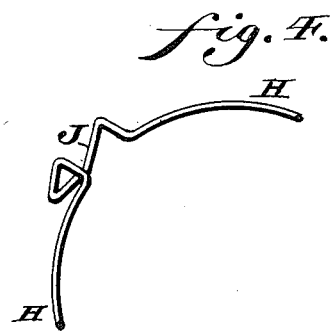
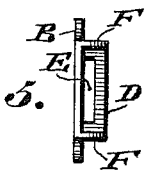
WITNESSES:
L. Douville,
P. H. Aagle.
INVENTOR
John J. Reutlinger
BY John A. Wiederheim
ATTORNEY.
THE NORRIS PETERS CO., PHOTO-LITHO., WASHINGTON, D. C.

UNITED STATES PATENT OFFICE.

JOHN J. REUTLINGER, OF PHILADELPHIA, PENNSYLVANIA.

FRYING-PAN.

SPECIFICATION forming part of Letters Patent No. 566,226, dated August 18, 1896.

Application filed May 19, 1896. Serial No. 592,118. (No model.)

*To all whom it may concern:*

Be it known that I, JOHN J. REUTLINGER, a citizen of the United States, residing in the city and county of Philadelphia, State of Pennsylvania, have invented a new and useful Improvement in Frying-Pans, which improvement is fully set forth in the following specification and accompanying drawings.

My invention relates to an improvement in a frying-pan and draining-basket in which the basket is adapted to be placed in the pan or held elevated above the same.

The invention consists of novel means for supporting such basket and also of novel means for permitting the basket to properly enter the pan.

Figure 1 represents a partial top or plan view and partial horizontal section on line $x$ $x$, Fig. 2, of a frying-pan and draining-basket embodying my invention. Fig. 2 represents a vertical section thereof on line $y$ $y$, Fig. 1. Figs. 3 and 4 represent perspective views of detached portions. Fig. 5 represents a top or plan view of the support on the pan for holding the basket in elevated position.

Similar letters of reference indicate corresponding parts in the several figures.

Referring to the drawings, A designates a frying-pan which, excepting the feature of my invention applied thereto, is of usual construction. Rising from the rim of the body of the pan is the standard B, in the lower portion of which is the vertical slot C, and above the latter is the horizontal ledge D with the slot E therein. At the sides of said slot E are the vertical flanges F, the same forming guides and guards for purposes to be hereinafter explained.

G designates a draining-basket whose peripheral rim H is formed with the hook J, whose inner limb is horizontal, and whose outer limb is vertical, the latter limb being adapted to enter the slot E, and thus engage with the ledge D, or to be fitted in the slot C, according to the position of said basket.

The operation is as follows: During the frying or cooking operation the basket occupies the pan, and the hook J enters the slot C and engages with the rim, preventing improper rotary movement of the basket, while it may readily emerge from the same during the removal of the basket. When it is desired to drain the article that has been fried or cooked or cease the frying or cooking operation, the basket is raised and the hook J inserted in the slot E, the outer vertical limb of said hook then resting against the standard B and the horizontal limb thereof being supported on the top of the rear wall of the ledge, as shown by the dotted lines in Fig. 2, by which provision the basket will be firmly held elevated on said standard directly over the pan, so that the draining or dripping may drop into the latter. Owing to the flanges F the hook may be readily guided into the slot E, while they also act as guards to prevent side play of the basket, for should the basket be moved laterally the sides of the horizontal limb of the hook will abut against said flanges F, and thus be controlled in said lateral direction. In practice the hook is made continuous of the piece of wire of which the rim H is formed.

Having thus described my invention, what I claim as new, and desire to secure by Letters Patent, is—

1. A frying-pan having a standard thereon, and a draining-basket having a hook on the rim thereof for supporting the basket elevated on said standard, the latter having a slot adapted to receive said hook, when the basket is supported on the rim of the pan, said hook then engaging with said rim, substantially as described.

2. A standard attached to a pan, and a ledge secured to said standard, and provided with a slot, said standard having a slot below said ledge, substantially as described.

3. A standard attached to a pan, a slotted ledge connected with said standard and guards rising from the sides of said ledge, substantially as described.

4. A draining-basket having on the rim thereof, a downwardly-projecting hook in combination with a pan, a standard rising from said pan and a slotted ledge connected with the upper part of said standard to receive said hook when the basket is elevated, said standard having a slot in its lower portion to receive said hook when the basket is within said pan, substantially as described.

5. A frying-pan having a standard rising therefrom and a draining-basket having on its rim a hook with a downwardly-projecting outer limb, said standard being provided with a horizontal ledge, with a vertical slot therein, the outer limb of said hook being adapted to enter said slot and bear against the standard and the inner limb thereof, to rest on the top of the rear wall of said ledge, substantially as described.

JOHN J. REUTLINGER.

Witnesses:
JOHN A. WIEDERSHEIM,
WM. C. WIEDERSHEIM.